US009268735B2

(12) United States Patent
Hans (10) Patent No.: US 9,268,735 B2
(45) Date of Patent: Feb. 23, 2016

(54) LOADABLE AND MODULAR CONDITIONAL ACCESS APPLICATION

(75) Inventor: Sebastian Jürgen Hans, Berlin (DE)

(73) Assignee: Oracle America, Inc., Redwood City, CA (US)

( * ) Notice: Subject to any disclaimer, the term of this patent is extended or adjusted under 35 U.S.C. 154(b) by 847 days.

(21) Appl. No.: 12/241,377

(22) Filed: Sep. 30, 2008

(65) Prior Publication Data

US 2010/0082831 A1    Apr. 1, 2010

(51) Int. Cl.
*G06F 15/16*    (2006.01)

(52) U.S. Cl.
CPC ...................... *G06F 15/16* (2013.01)

(58) Field of Classification Search
CPC .................................................... H04N 21/266
USPC .......................................................... 709/225
See application file for complete search history.

(56) References Cited

U.S. PATENT DOCUMENTS

| | | |
|---|---|---|
| 5,003,384 A | 3/1991 | Durden et al. |
| 5,155,590 A | 10/1992 | Beyers et al. |
| 5,235,619 A | 8/1993 | Beyers et al. |
| 5,357,276 A | 10/1994 | Banker et al. |
| 5,420,866 A | 5/1995 | Wasilewski |
| 5,420,923 A | 5/1995 | Beyers et al. |
| 5,440,632 A | 8/1995 | Bacon et al. |
| 5,457,701 A | 10/1995 | Wasilewski et al. |
| 5,481,542 A | 1/1996 | Logston et al. |
| 5,497,187 A | 3/1996 | Banker et al. |
| 5,684,876 A | 11/1997 | Pinder et al. |
| 7,018,227 B2 * | 3/2006 | Takahashi ...................... 439/347 |
| 7,680,275 B1 * | 3/2010 | Balestri et al. ................ 380/201 |
| 7,690,006 B2 * | 3/2010 | Birnbaum et al. ............. 719/328 |
| 2002/0141431 A1 * | 10/2002 | Tripathy ........................ 370/428 |
| 2004/0044779 A1 * | 3/2004 | Lambert ........................ 709/229 |
| 2005/0141713 A1 * | 6/2005 | Genevois ...................... 380/239 |
| 2005/0143127 A1 * | 6/2005 | Ou ................................ 455/557 |
| 2005/0144019 A1 * | 6/2005 | Murakami et al. ................ 705/1 |
| 2005/0175178 A1 * | 8/2005 | Candelore et al. ............ 380/201 |
| 2005/0188228 A1 * | 8/2005 | DeMello et al. .............. 713/201 |

(Continued)

OTHER PUBLICATIONS

Multi-Stream CableCARD Module, www.scientificatlanta.com, Sep. 2006, Scientific-Atlanta, inc.

(Continued)

*Primary Examiner* — Andrew Goldberg
(74) *Attorney, Agent, or Firm* — Polsinelli PC (57) ABSTRACT

A CAS device receives streaming media content encrypted utilizing a CAS, decrypts the received streaming media content utilizing a CAS module associated with the CAS, and transmits the unencrypted streaming media content to a rendering device. The CAS device may be operable to receive and store an additional CAS module associated with an additional CAS. The CAS device may also be operable to receive unencrypted streaming media content, encrypt the streaming media content utilizing a CAS module, and transmit the encrypted streaming media content. In another embodiment, the CAS device receives streaming media content encrypted utilizing a first CAS, decrypts the received streaming media content utilizing a first CAS module, transmits the unencrypted streaming media content from the first CAS module to a second CAS module, encrypts the unencrypted streaming media content utilizing the second CAS module, and transmits the encrypted streaming media content to a rendering device.

13 Claims, 8 Drawing Sheets

(56) References Cited

U.S. PATENT DOCUMENTS

| | | | |
|---|---|---|---|
| 2005/0190917 A1* | 9/2005 | Noh | 380/239 |
| 2005/0240974 A1* | 10/2005 | Hiramoto et al. | 725/100 |
| 2006/0062387 A1* | 3/2006 | Michalczak et al. | 380/239 |
| 2006/0242069 A1* | 10/2006 | Peterka et al. | 705/50 |
| 2007/0033419 A1* | 2/2007 | Kocher et al. | 713/193 |
| 2007/0156603 A1* | 7/2007 | Yoon et al. | 705/59 |
| 2007/0172059 A1* | 7/2007 | Yamaguchi et al. | 380/228 |
| 2007/0250912 A1* | 10/2007 | Rassool et al. | 726/4 |
| 2008/0037782 A1* | 2/2008 | Morten | 380/239 |
| 2008/0092181 A1* | 4/2008 | Britt | 725/87 |
| 2008/0137848 A1* | 6/2008 | Kocher et al. | 380/201 |
| 2008/0154775 A1* | 6/2008 | Soukup | 705/51 |
| 2008/0209464 A1* | 8/2008 | Wright-Riley | 725/25 |

OTHER PUBLICATIONS

PowerKEY CableCARD Module, www.scientificatlanta.com, Sep. 2003, Scientific-Atlanta, Inc.

MediaCipher Multi-Stream Cable Card (M-Card), www.motorola.com, 2007, Motorola, Inc.

\* cited by examiner

LOADABLE AND MODULAR CONDITIONAL ACCESS APPLICATION

FIELD OF THE INVENTION

This invention relates generally to conditional access systems, and more specifically to methods and apparatus for a loadable and modular conditional access application.

BACKGROUND

Streaming media content is media content that is constantly received by, and normally rendered to, an end-user while being delivered by a streaming media content provider. Providers of streaming media content, such as the MPEG (moving picture experts group) streams in television (including, but not limited to direct broadcast satellite television) or IPTV (Internet protocol television), typically protect the streaming media content to prevent copying or storing of the content and distribution of that content over channels that are not under the control of the providers. Conditional Access Systems (CAS) may be utilized to protect streaming media content.

Typically, the streaming media content is encrypted. In some streaming media content distribution systems which encrypt content utilizing a CAS, encrypted keys that may be utilized to decrypt the streaming media content, referred to as entitlement control messages (ECM), are distributed in-band with the streaming media content. In order to utilize the ECM to decrypt the streaming media content, the ECM are typically decrypted utilizing an EMM (entitlement management message) key. EMM keys may be distributed out-of-band of the streaming media content and/or in-band with the streaming media content. ECM keys are typically set to expire in a much shorter time period than EMM keys.

SUMMARY

In an embodiment, a CAS (Conditional Access System) device may receive streaming media content that has been encrypted utilizing a CAS. The streaming media content may include information identifying the CAS that has been utilized to encrypt the streaming media content. The CAS device may determine the CAS that has been utilized to encrypt the streaming media content by analyzing the information included in the streaming media content. The CAS device may analyze the information included in the streaming media content while parsing the streaming media content. The CAS device may load a CAS module. The CAS module may comprise a Java Card (including, but not limited to, Java Card 3.0) application. Java Card may be implemented utilizing an applet model, a servlet model, an extended applet model, or other Java Card model and the Java Card application may comprise an applet, a servlet, extended applet, or other Java Card platform application. The CAS module may be associated with the CAS. The CAS module may decrypt the received streaming media content. The CAS device may then transmit the unencrypted streaming media content to a rendering device. The CAS device may also be operable to receive unencrypted streaming media content, load a CAS module, encrypt the streaming media content associated with the CAS module, and transmit the encrypted streaming media content. The CAS device may be further operable to load a CAS module, encrypt and/or decrypt media content stored on the CAS device, and stream the media content to the rendering device.

The CAS device may include a processing unit, a storage medium operably coupled to the processing unit, a first interface operably coupled to the processing unit, and a second interface operably coupled to the processing unit. The storage medium may be operable to store one or more CAS modules associated with one or more CAS. The first interface may be operable to receive streaming media content that has been encrypted utilizing a CAS. The processing unit may be operable to load a CAS module associated with a CAS that has been utilized to encrypt streaming media content received utilizing the first interface. The processing unit may be operable to utilize the CAS module to decrypt the streaming media content and transmit the unencrypted streaming media content to a rendering device via the second interface.

The CAS device may also be operable to receive an additional CAS module associated with an additional CAS via the first interface. The processing unit may be operable to store the additional CAS module associated with the additional CAS in the storage medium.

In an alternative embodiment, the CAS device may comprise a pluggable component operable to interface with the rendering device when the pluggable component is plugged into the rendering device.

In another alternative embodiment, the CAS device may receive streaming media content that has been encrypted utilizing a first CAS. The streaming media content may include information identifying the CAS that has been utilized to encrypt the streaming media content. The CAS device may determine the CAS that has been utilized to encrypt the streaming media content by analyzing the information included in the streaming media content. The CAS device may analyze the information included in the streaming media content while parsing the streaming media content. The CAS device may load a first CAS module. The first CAS module may be associated with the first CAS. The first CAS module may decrypt the received streaming media content. The CAS device may load a second CAS module. The CAS device may load the second CAS module base on information included in the streaming media content. The second CAS module may be associated with a second CAS. The CAS device may transmit the unencrypted streaming media content from the first CAS module to the second CAS module. Optionally, the CAS device may also transmit the unencrypted streaming media content to a rendering device. The second CAS module may encrypt the unencrypted streaming media content utilizing the second CAS. The CAS device may then transmit the encrypted streaming media content to a rendering device.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

DETAILED DESCRIPTION OF THE EMBODIMENTS

In order to securely handle cryptographic keys, some streaming media content distribution systems which encrypt content utilizing a CAS (conditional access system) may utilize a CAS device (including, but not limited to, smart cards). The CAS device may be coupled to a rendering device. A rendering device may comprise any device for rendering the streaming media content including, but not limited to, a set-top box and/or a set-top unit (a device that connects to a television and an external source of signal, turning the signal into content which is then displayed on the television screen), a digital computer, a desktop computer, a laptop computer, a television, a home theater system, a digital media receiver, a media extender, a HDD (hard disk drive) media player, a cable converter box, and/or a digital video recorder. EMM (entitlement management message) keys may be stored and processed within the CAS device. The EMM keys may be utilized within the CAS device to decrypt ECM (entitlement control message) keys. The decrypted ECM keys may be exported to the rendering device, where they may be utilized for a short period of time to decrypt received streaming media content.

CAS devices, however, do not conventionally handle the streaming media content itself and/or decrypt the streaming media content within the CAS device and transmit the decrypted streaming media content to the rendering device. As such, CAS applications are conventionally implemented partially in a CAS device and partially in a rendering device. Thus, rendering devices must typically be equipped with built-in security capabilities and must typically be able to process output from a CAS device. However, CAS are typically closed systems, typically proprietary and not publicly disclosed. Most CAS are not interoperable and CAS devices and rendering devices equipped for content encrypted with one CAS may be inoperable with encrypted with another CAS. Thus, conventional CAS devices and rendering devices may be unable to receive streaming media content from more multiple providers that utilize different CAS to encrypt content or switch from a first provider that utilizes one CAS to encrypt content to another provider that utilizes another CAS to encrypt content.

Figure 1:
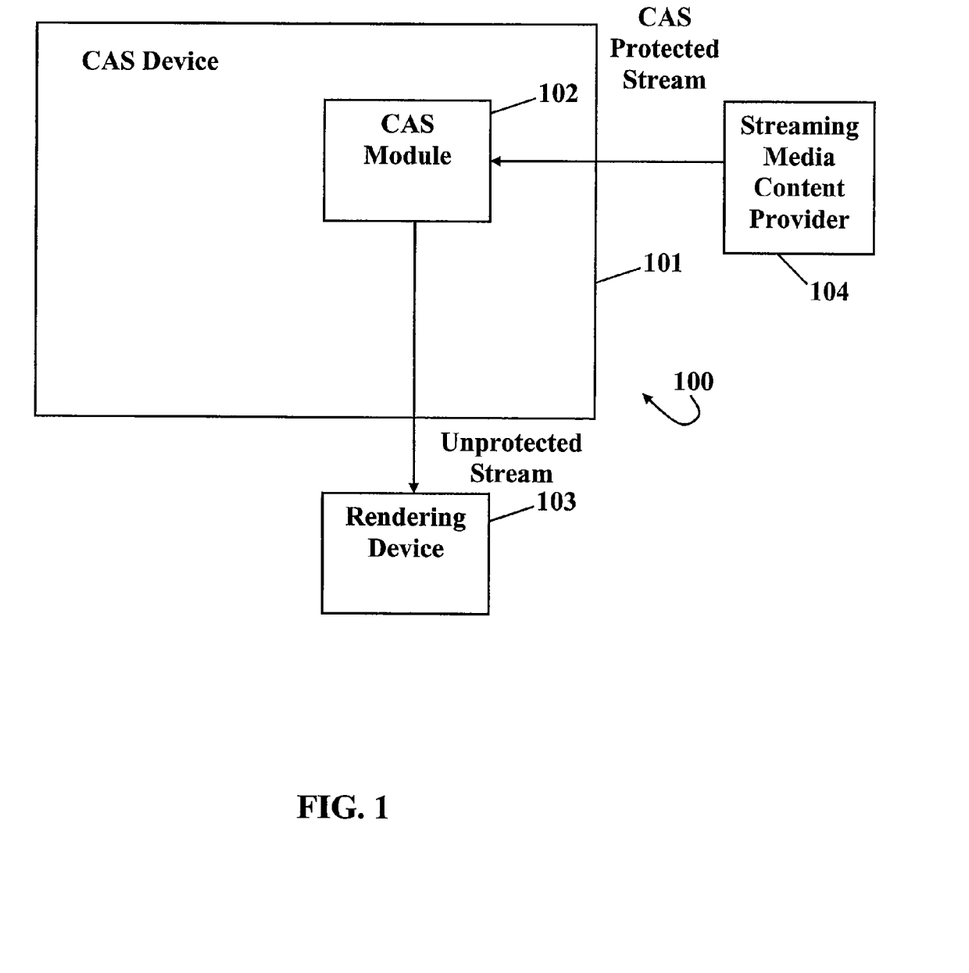
FIG. 1 is a block diagram a streaming media content distribution system 100 configured and operating in accordance with an embodiment of the present disclosure.

FIG. 1 is a block diagram illustrating a streaming media content distribution system 100 configured and operating in accordance with an embodiment of the present disclosure. A conditional access system (CAS) device 101 may receive streaming media content transmitted by a streaming media content provider 104 (including, but not limited to, a direct broadcast satellite television provider, a cable television provider, and/or an Internet protocol television provider). The CAS device 101 may receive the streaming media content directly from the streaming media content provider 104 via a communication link including, but not limited to, a satellite link, a cable link, and/or the Internet. Alternatively, a rendering device 103 may receive the streaming media content from the streaming media content provider 104 and may transmit the streaming media content to the CAS device 101. The streaming media content may have been encrypted by the streaming media content provider 104 utilizing a CAS. The streaming media content may include information identifying the CAS that has been utilized to encrypt the streaming media content. The CAS device 101 may determine the CAS that has been utilized to encrypt the streaming media content by analyzing the information included in the streaming media content. The CAS device 101 may analyze the information included in the streaming media content while parsing the streaming media content. The CAS device 101 may load a CAS module 102. The CAS module 102 may be associated with the CAS. For example, streaming media content may be received that has been encrypted utilizing the Powervu™ CAS. In such a case, the CAS device 101 may parse the received streaming media content and determine based on information included in the received streaming media content that the streaming media content has been encrypted utilizing the Powervu™ CAS. The CAS device 101 may load the CAS module 102 wherein the CAS module 102 is associated with the Powervu™ CAS (i.e. the CAS module 102 is able to encrypt and/or decrypt streaming media content utilizing the Powervu™ CAS). The CAS module 102 may decrypt the received streaming media content. The CAS device 101 may then transmit the unencrypted streaming media content to the rendering device 103.

By way of example, a rendering device 103 may receive streaming media content provided by a streaming media content server across the Internet. The streaming media content may have been encrypted utilizing the CAS. The rendering device may transmit the encrypted streaming media content to a CAS device 101 which may be coupled to the rendering device. The CAS device 101 may parse the encrypted streaming media content and determine based on information included in the encrypted streaming media content that the encrypted streaming media content has been encrypted utilizing the CAS. The CAS device 101 may load a CAS module 102 associated with the CAS, decrypt the streaming media content utilizing the CAS module 102, and transmit the unencrypted streaming media content to the rendering device. The rendering device may then render the unencrypted streaming media content. The rendering device may render the unencrypted streaming media content by displaying video of the streaming media content (such as on a television, cathode-ray tube display, liquid crystal display, high definition television, flat screen television, or other display device) and/or by playing audio from the streaming media content (such as through one or more speakers, headsets, and/or earphones).

The CAS module 102 may comprise a Java Card application (including, but not limited to, Java Card 3.0 developed by Sun Microsystems, Inc. and detailed at the web site java.sun.com/javacard/3.0/ which is herein incorporated by reference in its entirety). Java Card may be implemented utilizing an applet model, a servlet model, an extended applet model, or other Java Card model and the Java Card application may comprise an applet, a servlet, an extended applet, or other Java Card platform application. Java card is a technology that allows small Java-based applications (applets) to run securely on smart cards and/or similar small memory foot print devices. Java card is the lightest version of Java and is targeted for embedded devices. Java Card 3.0, along with advances in smart card technology, may for the first time provide the CAS device 101 with the processing ability to handle the streaming media content itself.

The CAS may include at least one of an analog conditional access system including, but not limited to, Eurocrypt™ conditional access system, Nagravision™ conditional access system, Videocypher™ conditional access system, and/or Videocrypt™ conditional access system and/or a digital conditional access system including, but not limited to, Nagravision Cardmagedon™ conditional access system, Nagravision Aladin™ conditional access system, Biss™ conditional access system, Conax™ conditional access system, Cryptoworks™ conditional access system, Irdeto™ conditional access system, Keyfly™ conditional access system, Mediaguard™ conditional access system, Videoguard™ conditional access system, Powervu™ conditional access system, Ras™ conditional access system, Digicipher™ CAS, and Viaccess™ conditional access system. The CAS may utilize RAS encryption algorithm, data encryption standard (DES) encryption algorithm, 3 DES encryption algorithm, blowfish encryption algorithm, international data encryption algorithm (IDEA), software-optimized encryption algorithm (SEAL), advanced encryption standard (AES) encryption algorithm, and RC4 encryption algorithm.

The CAS device 101 may also be operable to receive unencrypted streaming media content, load a CAS module 102, encrypt the streaming media content associated with the CAS module 102, and transmit the encrypted streaming media content. By way of example, a user of a rendering device may utilize a CAS device 101, coupled to the rendering device, to protect their own streaming media content prior to distribution or storage. The CAS device 101 may be further operable to load a CAS module 102, encrypt and/or decrypt media content stored on the CAS device 101, and stream the media content to the rendering device 103.

Figure 2:
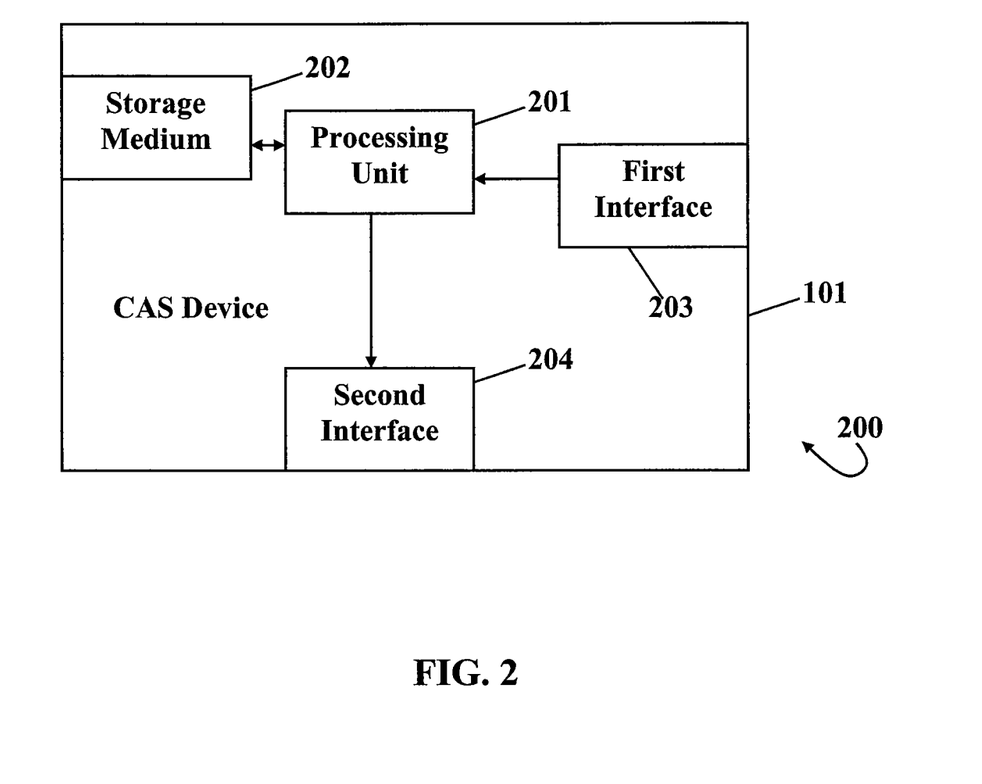
FIG. 2 is a block diagram illustrating the architecture 200 of a CAS device 101, in accordance with an embodiment of the present disclosure.

FIG. 2 is a block diagram illustrating the architecture 200 of a CAS device 101, in accordance with an embodiment of the present disclosure. The CAS device 101 may comprise a smart card. The CAS device 101 may include a processing unit 201, a storage medium 202 operably coupled to the processing unit 201, a first interface 203 operably coupled to the processing unit 201, and a second interface 204 operably coupled to the processing unit 201. The storage medium 202 may be operable to store one or more CAS modules associated with one or more CAS. The one or more CAS modules may have been received by the CAS device 101 via the first interface 203, and stored in the storage medium 202 by the processing unit 201. Alternatively, the one or more CAS modules may have been preinstalled in the storage medium 202 before and/or during manufacture of the CAS device 101. The storage medium 202 may include any mechanism for storing information in a form (e.g., software, processing application) readable by a machine (e.g., a computer). The storage medium 202 may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; and/or other types of medium suitable for storing information in a form readable by a machine.

The first interface 203 may be operable to receive streaming media content that has been encrypted utilizing a CAS. The streaming media content may include information identifying the CAS that has been utilized to encrypt the streaming media content. The processing unit 201 may determine the CAS that has been utilized to encrypt the streaming media content by analyzing the information included in the streaming media content. The processing unit 201 may analyze the information included in the streaming media content while parsing the streaming media content. The processing unit 201 may be operable to load a CAS module associated with a CAS that has been utilized to encrypt streaming media content received utilizing the first interface 203. The processing unit 201 also may be operable to utilize the CAS module to decrypt the streaming media content and transmit the unencrypted streaming media content to a rendering device via the second interface 204.

The CAS device 101 may also receive an additional CAS module associated with an additional CAS via the first interface 203. Like with the one or more CAS modules referred to above, the processing unit 201 may store the additional CAS module in the storage medium 202.

Figure 3:
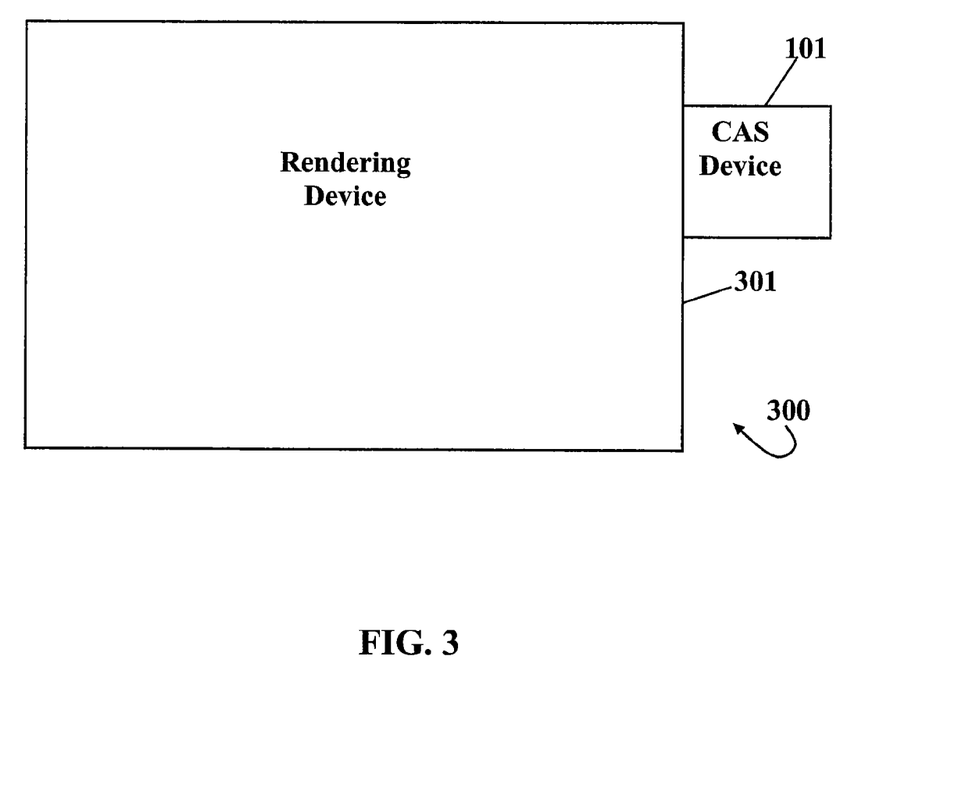
FIG. 3 is a diagram illustrating a rendering system 300 including a CAS device 101 coupled with a rendering device 301, in accordance with an alternative embodiment of the present disclosure.

FIG. 3 is a diagram illustrating a rendering system 300 including a CAS device 101 coupled with a rendering device 301, in accordance with an alternative embodiment of the present disclosure. The CAS device 101 may comprise a pluggable component operable to interface with the rendering device 301. The rendering device may include a port or other interface for interfacing with the CAS device 101. The CAS device 101, when interfaced with the rendering device 301, may be integrated into the rendering device 301 as a local Internet Protocol node and the rendering device may communicate with the CAS device 101 (and/or one or more modules of the CAS device 101) via standard Internet protocols.

By way of example, the CAS device 101 may comprise a pluggable component that is operable to interface with the rendering device 301 via a USB (universal serial bus) and/or a USB 2.0 interface. In such a case, the CAS device 101 may interface with the rendering device 301 when the CAS device 101 is plugged into a USB and/or USB 2.0 port of the rendering device 301.

By way of another example, the CAS device 101 may comprise a contact smart card that is operable to interface with the rendering device 301 via a card acceptance device (e.g., a smart card reader). Contact smart cards may have a contact area. When inserted into a card acceptance device, the contact area may make contact with electrical connectors that can read information from the chip and write information back. In such as case, the CAS device 101 may interface with the rendering device 301 when the CAS device 101 is plugged into a card acceptance device of the rendering device 301. Alternatively, the CAS device 101 may comprise a separate integrated circuit device incorporated into the rendering device 301.

Figure 4:
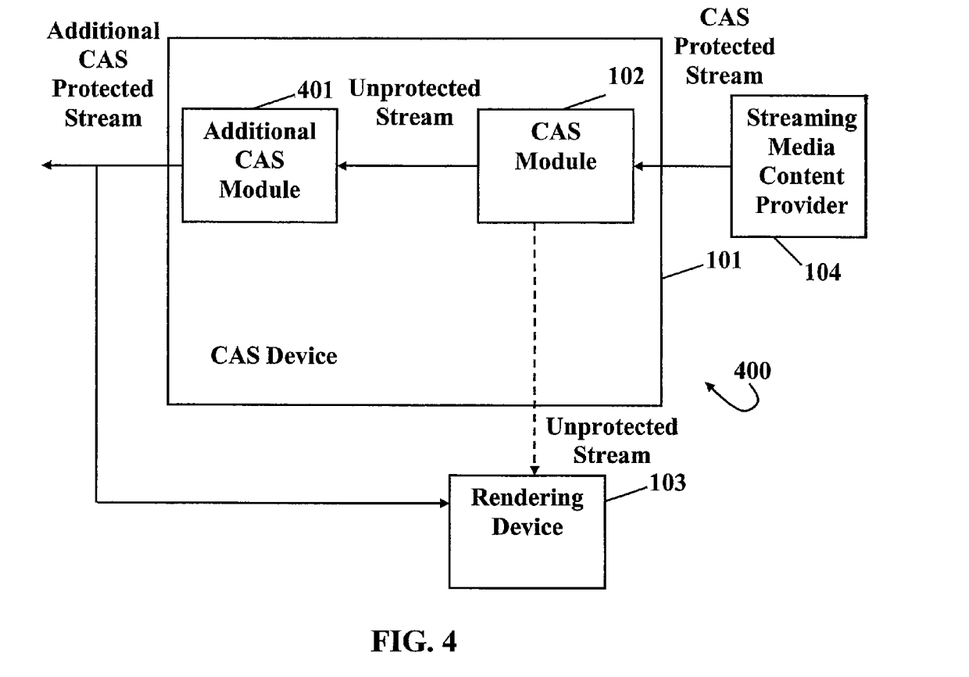
FIG. 4 is a block diagram illustrating a streaming media content distribution system 400 configured and operating in accordance with an alternative embodiment of the present disclosure.

FIG. 4 is a block diagram illustrating a streaming media content distribution system 400 configured and operating in accordance with an alternative embodiment of the present disclosure. A CAS device 101 may receive streaming media content transmitted by a streaming media content provider 104. The streaming media content may have been encrypted by the streaming media content provider 104 utilizing a first CAS. The streaming media content may include information identifying the CAS that has been utilized to encrypt the streaming media content. The CAS device 101 may determine the CAS that has been utilized to encrypt the streaming media content by analyzing the information included in the streaming media content. The CAS device 101 may analyze the information included in the streaming media content while parsing the streaming media content. The CAS device 101 may load a first CAS module 102. The first CAS module 102 may include a Java Card (including, but not limited to, Java Card 3.0) application. Java Card may be implemented utilizing an applet model, a servlet model, an extended applet model, or other Java Card model and the Java Card application may comprise an applet, a servlet, an extended applet, or other Java Card platform application. The first CAS module 102 may be associated with the first CAS. For example, streaming media content may be received that has been encrypted utilizing the Videoguard™ CAS. In such a case, the CAS device 101 may parse the streaming media content and determine based on information included in the streaming media content that the streaming media content has been encrypted utilizing the Videoguard™ CAS. The CAS device 101 may load the first CAS module 102, and the first CAS module 102 is associated with the Videoguard™ CAS (i.e. the CAS module 102 is able to encrypt and/or decrypt streaming media content utilizing the Videoguard™ CAS).

The first CAS module 102 may then decrypt the received streaming media content. The CAS device 101 may load a second CAS module 401. The CAS device 101 may load the second CAS module 401 based on information included in the received streaming media content. The second CAS module 401 may include a Java Card (including, but not limited to, Java Card 3.0) application. Java Card may be implemented utilizing an applet model, a servlet model, an extended applet model, or other Java Card model and the Java Card application may comprise an applet, a servlet, an extended applet, or other Java Card platform application. The second CAS module 401 may be associated with a second CAS (i.e. the second CAS module 401 is able to encrypt and/or decrypt streaming media content utilizing the second CAS). The CAS device 101 may transmit the unencrypted streaming media content from the first CAS module 102 to the second CAS module 401. The first CAS module 102 and/or the second CAS module 401 may include one or more APIs (application programming interfaces) for transmitting information between the modules. Optionally, the CAS device 101 may also transmit the unencrypted streaming media content to a rendering device 103. The transmission between the first CAS module 102 and the second CAS module 401 may authenticate the first CAS module 102 and/or the second CAS module 401. As the transmission between the first CAS module 102 and the second CAS module 401 does not leave the CAS device 101, the transmission may be secure.

Further, the second CAS module 401 may encrypt the unencrypted streaming media content utilizing the second CAS. For example, the second CAS module 401 may be associated with the Nagravision™ CAS (i.e. the CAS module 401 is able to encrypt and/or decrypt streaming media content utilizing the Nagravision™ CAS). The second CAS module 401 may then encrypt the unencrypted streaming media content utilizing the Nagravision™ CAS. The CAS device 101 may then transmit the encrypted streaming media content to a rendering device 103. The rendering device 103 may be configured to utilize and/or store streaming media content encrypted with the Nagravision™ CAS. If the rendering device 103 is configured to render streaming media content encrypted with the Nagravision™ CAS, utilizing the CAS device 101 to convert received streaming media content encrypted utilizing the Videoguard™ CAS to streaming media content encrypted with the Nagravision™ CAS enables the rendering device 103 to render the streaming media content without requiring that the streaming media content be unencrypted outside of the CAS device 101.

By way of another example, a rendering device, which is coupled to the CAS device 101, may receive streaming media content that has been encrypted utilizing the Digicipher™ CAS. The Digicipher™ encrypted streaming media content may include an MPEG-2 stream which may include encrypted content and encrypted keys Ks (ECMs). Keys Ka (EMMs) may have been received separately in a secure container compliant with the Digicipher™ CAS or may have been included in the encrypted streaming media content. The rendering device may transmit the streaming media content to the CAS device 101. The CAS device 101 may parse the streaming media content and determine based on information included in the streaming media content that the streaming media content was encrypted utilizing the Digicipher™ CAS. The CAS device 101 may load a first CAS module 102 wherein the first CAS module 102 is associated with the Digicipher™ CAS. The first CAS module 102 may decrypt the received streaming media content. The CAS device 101 may load a second CAS module 401 associated with Project DReaM™ (a digital rights management system). The CAS device 101 may load the second CAS module 401 based on information included in the streaming media content. The CAS device 101 may transmit the unencrypted streaming media content from the first CAS module 102 to the second CAS module 401. Optionally, the CAS device 101 may also transmit the unencrypted streaming media content to the rendering device 103 which may then render the MPEG-2 content. The second CAS module 401 may encrypt the unencrypted streaming media content utilizing Project DReaM™. The encrypted streaming media content may include an MPEG-2 stream which may include encrypted content and encrypted keys Ks (ECMs). Keys Ka (EMMs) may be contained separately in a secure container compliant with Project DReaM™ or may be included in the encrypted streaming media content. The CAS device 101 may then transmit the DReaM™ encrypted streaming media content to a rendering device 103. The rendering device may be configured to utilize and/or store streaming media content encrypted with Project DReaM™. If the rendering device 103 is configured to store streaming media content encrypted with Project DReaM™, utilizing the CAS device 101 to convert received streaming media content encrypted utilizing the Digicipher™ CAS to streaming media content encrypted with Project DReaM™ enables the rendering device 103 to store the streaming media content in a protected format without requiring that the streaming media content be unprotected outside of the CAS device 101.

Figure 5:
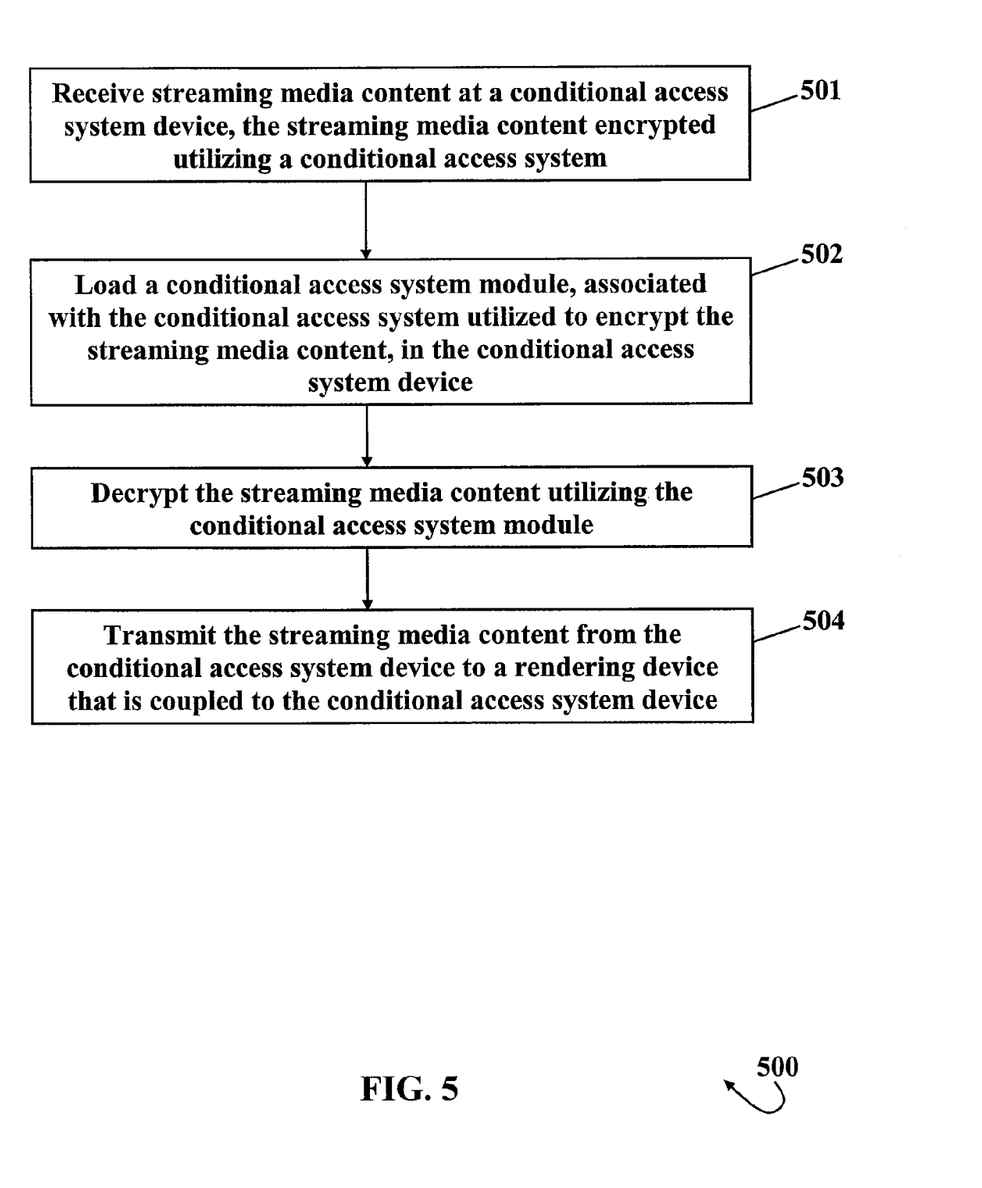
FIG. 5 is a method diagram illustrating a method for handling streaming media content; in accordance with an embodiment of the present disclosure.

FIG. 5 is a method diagram illustrating a method for handling streaming media content, in accordance with an embodiment of the present disclosure. In step 501, receive streaming media content at a conditional access system device, the streaming media content encrypted utilizing a conditional access system. The operation of receiving streaming media content at a conditional access system device may include receive streaming media content at a smart card. In step 502, load a conditional access system module (such as a Java Card applet, servlet, extended applet, or other Java Card platform application) associated with the conditional access system utilized to encrypt the streaming media content, in the conditional access system device. The streaming media content may include information identifying the conditional access system that has been utilized to encrypt the streaming media content. The conditional access system device may determine the conditional access system that has been utilized to encrypt the streaming media content by analyzing the information included in the streaming media content. The conditional access system device may analyze the information included in the streaming media content while parsing the streaming media content. In step 503, decrypt the streaming media content utilizing the conditional access system module. The operation of decrypting the streaming media content utilizing the conditional access system module may include decrypting an encrypted entitlement control message utilizing an entitlement management message and decrypting the streaming media content utilizing the decrypted entitlement control message. In step 504, transmit the streaming media content from the conditional access system device to a rendering device that is coupled to the conditional access system device.

Figure 6:
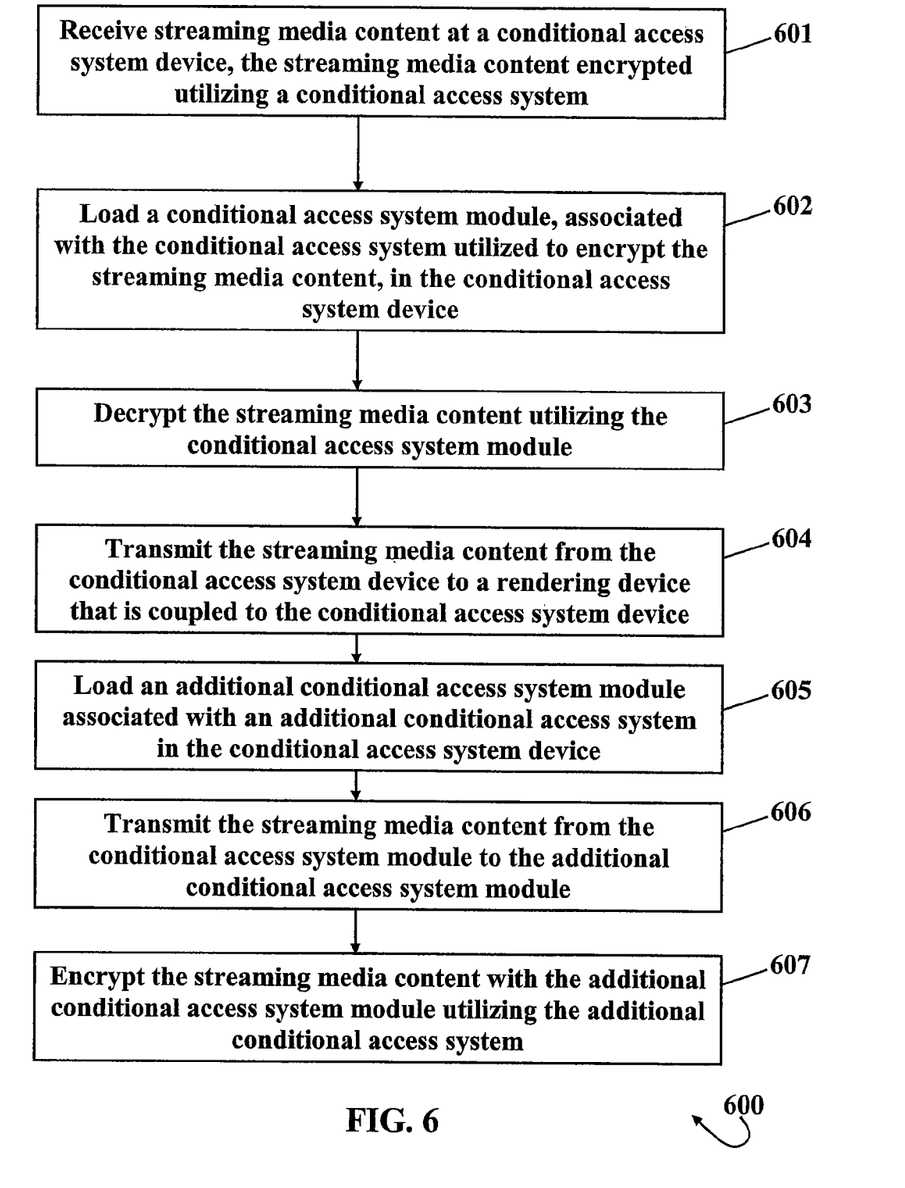
FIG. 6 is a method diagram illustrating a method for handling streaming media content; in accordance with an alternative embodiment of the present disclosure.

FIG. 6 is a method diagram illustrating a method for handling streaming media content, in accordance with an alternative embodiment of the present disclosure. In step 601, receive streaming media content at a conditional access system device, the streaming media content encrypted utilizing a conditional access system. In step 602, load a conditional access system module, associated with the conditional access system utilized to encrypt the streaming media content, in the conditional access system device. In step 603, decrypt the streaming media content utilizing the conditional access system module. In step 604, transmit the streaming media content from the conditional access system device to a rendering device that is coupled to the conditional access system device. In step 605, load an additional conditional access system module associated with an additional conditional access system in the conditional access system device. In step 606, transmit the streaming media content from the conditional access system module to the additional conditional access system module. In step 607, encrypt the streaming media content with the additional conditional access system module utilizing the additional conditional access system.

Figure 7:
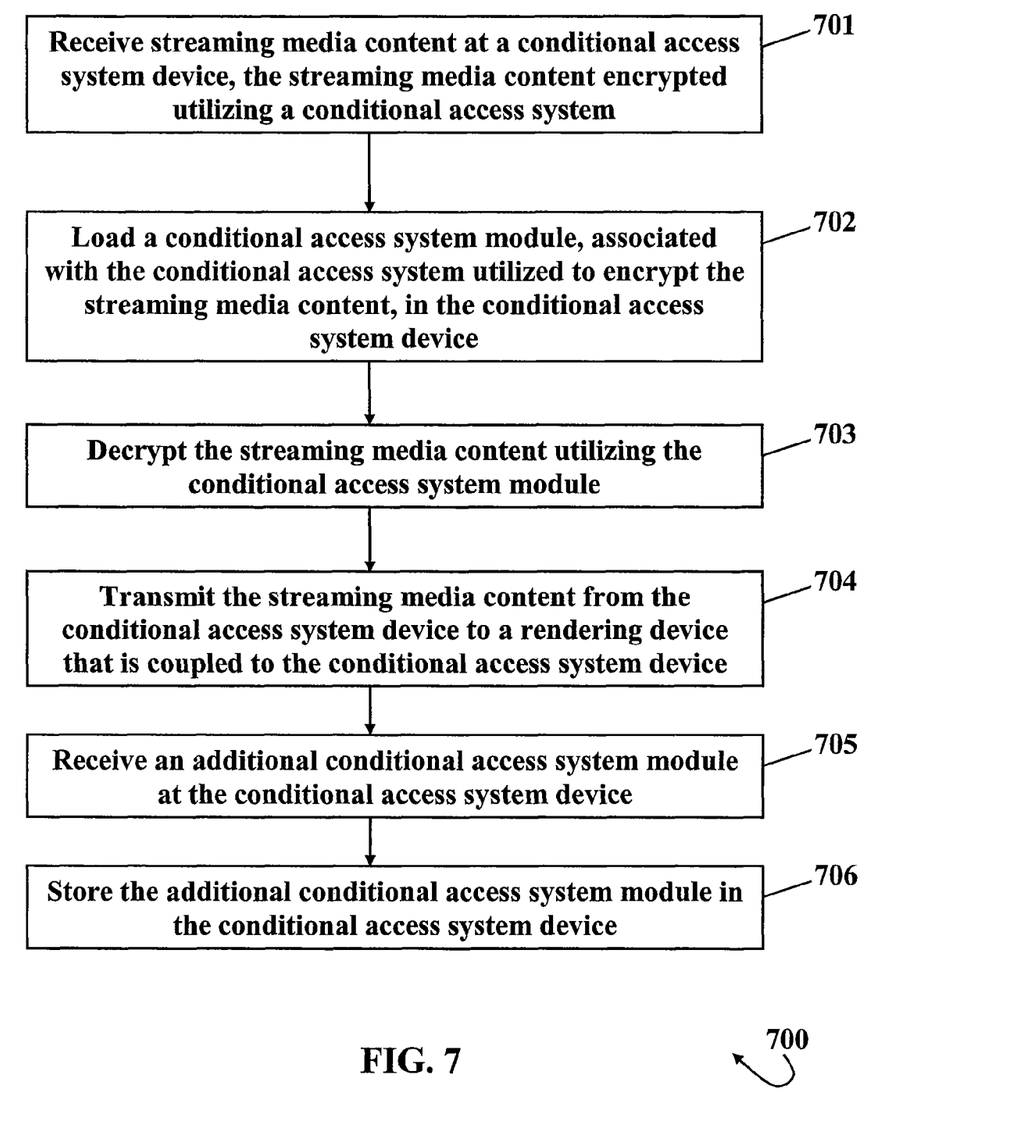
FIG. 7 is a method diagram illustrating a method for handling streaming media content; in accordance with an alternative embodiment of the present disclosure.

FIG. 7 is a method diagram illustrating a method for handling streaming media content, in accordance with an alternative embodiment of the present disclosure. In step 701, receive streaming media content at a conditional access system device, the streaming media content encrypted utilizing a conditional access system. In step 702, load a conditional access system module, associated with the conditional access system utilized to encrypt the streaming media content, in the conditional access system device. In step 703, decrypt the streaming media content utilizing the conditional access system module. In step 704, transmit the streaming media content from the conditional access system device to a rendering device that is coupled to the conditional access system device. In step 705, receive an additional conditional access system module at the conditional access system device. In step 706, store the additional conditional access system module in the conditional access system device.

Figure 8:
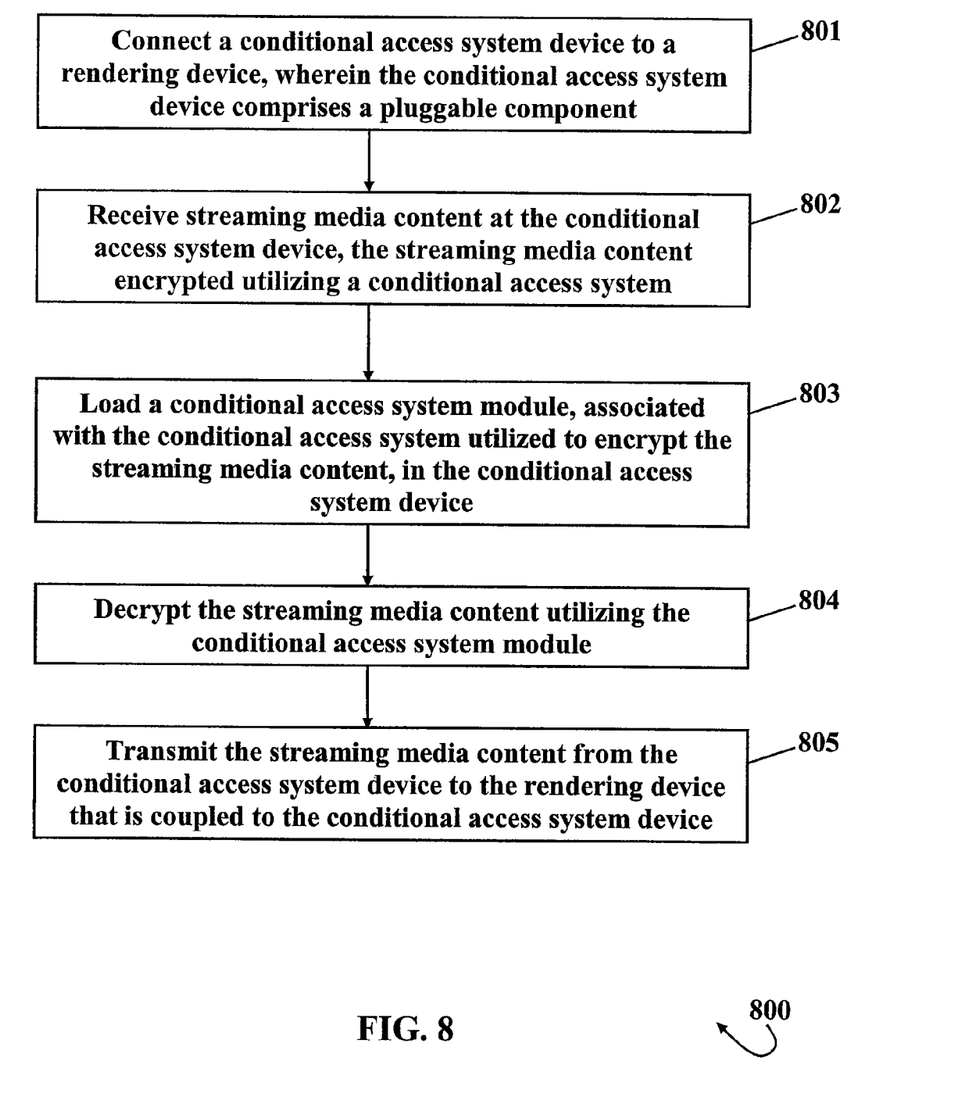
FIG. 8 is a method diagram illustrating a method for handling streaming media content; in accordance with an alternative embodiment of the present disclosure.

FIG. 8 is a method diagram illustrating a method for handling streaming media content, in accordance with an alternative embodiment of the present disclosure. In step 801, connect a conditional access system device to a rendering device, wherein the conditional access system device comprises a pluggable component. In step 802, receive streaming media content at the conditional access system device, the streaming media content encrypted utilizing a conditional access system. In step 803, load a conditional access system module, associated with the conditional access system utilized to encrypt the streaming media content, in the conditional access system device. In step 804, decrypt the streaming media content utilizing the conditional access system module. In step 805, transmit the streaming media content from the conditional access system device to the rendering device that is coupled to the conditional access system device.

The present disclosure may provide a CAS device that is operable to handle streaming media content (including, but not limited to, encryption and decryption of the streaming media content) within the CAS device. As such, rendering devices operable to interface with the CAS device may not require security capabilities. The loadable and/or modular CAS applications included in (and/or addable to) the disclosed CAS device may provide interoperability between different CAS, enabling switching between various streaming media content providers and/or utilization of multiple streaming media content providers. The disclosed CAS device also may enable encryption of unencrypted streaming media content, conversion between different CAS, and/or storage of received streaming media content in a secured form.

The description above includes example systems, methods, techniques, instruction sequences, and/or computer program products that embody techniques of the present disclosure. However, it is understood that the described disclosure may be practiced without these specific details. Reference will now be made in detail to the subject matter disclosed, which is illustrated in the accompanying drawings.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readably by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method comprising:
receiving streaming media content at a first interface from a streaming media content provider at a conditional access system device, the streaming media content being encrypted utilizing a conditional access system encryption algorithm and the first interface being a cable link;
identifying, on the conditional access system device, the conditional access system encryption algorithm used to encrypt the streaming media content;
receiving a conditional access system decryption module application at the conditional access system device based on the identification of the conditional access system encryption algorithm, the conditional access system decryption module application received through the first interface from the streaming media content provider;
storing the conditional access system decryption module application in a storage medium of the conditional access system device;
loading the conditional access system decryption module application in the conditional access system device, the conditional access system decryption module application being associated with the conditional access system encryption algorithm utilized to encrypt the streaming media content;
decrypting the streaming media content on the conditional access system device utilizing the loaded conditional access system decryption module application to obtain decrypted streaming media;
transmitting the decrypted streaming media content from the conditional access system device to a rendering device that is coupled to the conditional access system device, the rendering device being capable of rendering the decrypted streaming media;
loading an additional conditional access system decryption module application, associated with an additional conditional access system encryption algorithm, in the conditional access system device;
transmitting the decrypted streaming media content from the conditional access system decryption module application to the additional conditional access system decryption module application; and
encrypting the decrypted streaming media content with the additional conditional access system module application utilizing the additional conditional access system encryption algorithm.

2. The method of claim 1, wherein the conditional access system device includes a smart card comprising the storage medium and the rendering device is a set-top box.

3. The method of claim 1, wherein loading the conditional access system decryption module application comprises:
loading at least one of a conditional access system Java card applet, a conditional access system Java card servlet, and a conditional access system java card extended applet, associated with conditional access system encryption algorithm utilized to encrypt the streaming media content, in the conditional access system device.

4. The method of claim 1, wherein decrypting the streaming media content comprises:
accessing an entitlement management message stored on the conditional access system device;
decrypting an encrypted entitlement control message associated with the streaming media content on the conditional access system device utilizing the entitlement management message; and
decrypting the streaming media content on the conditional access system device utilizing the decrypted entitlement control message to obtain the decrypted streaming media.

5. The method of claim 1, wherein the conditional access system encryption algorithm utilizes at least one of RAS encryption algorithm, data encryption standard (DES) encryption algorithm, 3 DES encryption algorithm, blowfish encryption algorithm, international data encryption algorithm (IDEA), software-optimized encryption algorithm (SEAL), advanced encryption standard (AES) encryption algorithm, and RC4 encryption algorithm.

6. The method of claim 1, wherein receiving streaming media content comprises:
receiving the streaming media content directly from the streaming media content provider at the conditional access system device through a communication link.

7. The method of claim 1, wherein the conditional access system device includes a pluggable smart card, the smart card being inserted within the rendering device during transmission of the decrypted streaming media content.

8. A conditional access system device, comprising:
a first interface being a cable link to receive streaming media content and a conditional access system decryption module application from a streaming media content provider, the streaming media content encrypted utilizing a conditional access system encryption algorithm and the conditional access system decryption module application based on an identification of the conditional access system;
a storage medium to store a conditional access system decryption module application associated with the conditional access system encryption algorithm utilized to encrypt the streaming media content and the conditional access system decryption module application;
a processing unit, coupled to the first interface and the storage medium, to load the received conditional access decryption module application associated with the conditional access system encryption algorithm from the storage medium and to utilize the conditional access system decryption module application associated with the conditional access system encryption algorithm to decrypt the streaming media; and
a second interface, coupled to the processing unit, to transmit the decrypted streaming media content;
wherein the storage medium stores at least one additional conditional access system module application associated with at least one additional conditional access system encryption algorithm and wherein the processing unit loads the at least one additional conditional system access module application associated with at least one additional conditional access system encryption algorithm, transmit the streaming media content between the conditional access system decryption module application to the additional conditional access system module application, and encrypt the streaming media content with the additional conditional access system module application utilizing the at least one additional conditional access system encryption algorithm.

9. The conditional access system device of claim 8, wherein the conditional access system decryption module application comprises at least one of a java card applet, a java card servlet, and a java card extended applet.

10. The conditional access system device of claim 8, wherein the processing unit accesses an entitlement management message stored on the conditional access system device; utilize the conditional access system decryption module application to decrypt an encrypted entitlement control message associated with the streaming media content on the conditional access system device utilizing the entitlement management message and decrypt the streaming media content utilizing the decrypted entitlement control message to obtain the decrypted streaming media.

11. The conditional access system device of claim 8, wherein the conditional access system utilizes at least one of RAS encryption algorithm, data encryption standard (DES) encryption algorithm, 3 DES encryption algorithm, blowfish encryption algorithm, international data encryption algorithm (IDEA), software-optimized encryption algorithm (SEAL), advanced encryption standard (AES) encryption algorithm, and RC4 encryption algorithm.

12. The conditional access system device of claim 8, wherein the conditional access system device includes a pluggable smart card to interface with the rendering device during transmission of the decrypted streaming media content.

13. A computer program product, including a non-transitory computer readable storage medium and instructions executable by a processing unit, the instructions comprising:
   a first set of instructions for receiving streaming media content from a streaming media content provider at a first interface of a conditional access system device, the streaming media content being encrypted utilizing a conditional access system encryption algorithm and the first interface being a cable link;
   a second set of instructions for identifying, on the conditional access system device, the conditional access system encryption algorithm used to encrypt the streaming media content;
   a third set of instructions for receiving a conditional access system decryption module application at the first interface from the streaming media content provider of the conditional access system device based on the identification of the conditional access system encryption algorithm and storing the conditional access system decryption module application in the conditional access system device;
   a fourth set of instructions for loading the conditional access system decryption module application in the conditional access system device, the conditional access system decryption module application being associated with the conditional access system encryption algorithm utilized to encrypt the streaming media content;
   a fifth set of instructions for decrypting the streaming media content on the conditional access system device utilizing the loaded conditional access system decryption module application to obtain decrypted streaming media; and
   a sixth set of instructions for transmitting the decrypted streaming media content from the conditional access system device to a rendering device that is coupled to the conditional access system device, the rendering device being capable of rendering the decrypted streaming media;
   a seventh set of instructions for loading an additional conditional access system decryption module application, associated with an additional conditional access system encryption algorithm, in the conditional access system device;
   an eighth set of instructions for transmitting the decrypted streaming media content from the conditional access system decryption module application to the additional conditional access system decryption module application; and
   a ninth set of instructions for encrypting the decrypted streaming media content with the additional conditional access system module application utilizing the additional conditional access system encryption algorithm.

* * * * *